United States Patent
Li

(10) Patent No.: US 10,278,094 B2
(45) Date of Patent: Apr. 30, 2019

(54) WIRELESS BACKHAUL METHOD, MOBILE TERMINAL, AND SYSTEM

(71) Applicant: Huawei Technologies Co., Ltd., Shenzhen, Guangdong (CN)

(72) Inventor: Jiang Li, Moscow (RU)

(73) Assignee: Huawei Technologies Co., Ltd., Shenzhen (CN)

( * ) Notice: Subject to any disclaimer, the term of this patent is extended or adjusted under 35 U.S.C. 154(b) by 212 days.

(21) Appl. No.: 15/360,051

(22) Filed: Nov. 23, 2016

(65) Prior Publication Data

US 2017/0078912 A1 Mar. 16, 2017

Related U.S. Application Data

(63) Continuation of application No. PCT/CN2014/078396, filed on May 26, 2014.

(51) Int. Cl.
*H04W 28/02* (2009.01)
*H04W 28/16* (2009.01)
(Continued)

(52) U.S. Cl.
CPC ....... *H04W 28/0268* (2013.01); *H04W 28/16* (2013.01); *H04W 40/00* (2013.01);
(Continued)

(58) Field of Classification Search
CPC . H04W 84/18; H04W 88/06; H04W 28/0268; H04W 28/16; H04W 40/00;
(Continued)

(56) References Cited

U.S. PATENT DOCUMENTS

2004/0001442 A1   1/2004   Rayment et al.
2009/0252088 A1   10/2009  Rao et al.
(Continued)

FOREIGN PATENT DOCUMENTS

CN   101983535 A   3/2011
CN   102143549 A   8/2011
(Continued)

OTHER PUBLICATIONS

IEEE Standards Association, "IEEE Standard for Information Technology—Telecommunication and Information Exchange Between Systems—Local and Metropolitan Area Networks—Specific Requirements—Part 11: Wireless LAN Medium Access Control (MAC) and Physical Layer (PHY) Specifications", IEEE Std 802.11, Mar. 20, 2012, New York, NY, 2,793 pages.

*Primary Examiner* — Paul H Masur

(57) ABSTRACT

The present invention discloses a first mobile terminal. A receiver receives wireless backhaul data sent by a wireless access point or a micro base station; a processor determines, according to a wireless network connection relationship of the first mobile terminal, at least one wireless backhaul channel for transmitting the wireless backhaul data, where the wireless backhaul channel includes a first access network device connected to a core network device, or a first access network device connected to a core network device, and at least one of the following transit nodes: at least one second mobile terminal or at least one second access network device; and a sender sends the wireless backhaul data to the first access network device according to the wireless backhaul channel, where the first access network device is configured to send the wireless backhaul data to the core network device.

13 Claims, 4 Drawing Sheets

(51) Int. Cl.
*H04W 40/00* (2009.01)
*H04W 72/04* (2009.01)
*H04W 72/10* (2009.01)
*H04W 84/18* (2009.01)

(52) U.S. Cl.
CPC ....... *H04W 72/04* (2013.01); *H04W 72/0486* (2013.01); *H04W 72/10* (2013.01); *H04W 84/18* (2013.01)

(58) Field of Classification Search
CPC .. H04W 72/04; H04W 72/0486; H04W 72/10
See application file for complete search history.

(56) References Cited

U.S. PATENT DOCUMENTS

| | | | |
|---|---|---|---|
| 2010/0046418 A1 | 2/2010 | Horn et al. | |
| 2012/0014314 A1 | 1/2012 | Chen et al. | |
| 2016/0309391 A1 | 10/2016 | Guo et al. | |
| 2016/0359750 A1* | 12/2016 | Miklos | H04L 47/24 |

FOREIGN PATENT DOCUMENTS

| | | | |
|---|---|---|---|
| CN | 103369616 A | 10/2013 | |
| CN | 103501499 A | 1/2014 | |
| CN | 103716835 A | 4/2014 | |
| CN | 103731897 A | 4/2014 | |
| WO | 2010111819 A1 | 10/2010 | |
| WO | 2013006769 A1 | 1/2013 | |
| WO | 2013058607 A1 | 4/2013 | |
| WO | 2014064869 A1 | 5/2014 | |

* cited by examiner

US 10,278,094 B2

WIRELESS BACKHAUL METHOD, MOBILE TERMINAL, AND SYSTEM

CROSS-REFERENCE TO RELATED APPLICATIONS

This application is a continuation of International Application No. PCT/CN2014/078396, filed on May 26, 2014, the disclosure of which is hereby incorporated by reference in its entirety.

TECHNICAL FIELD

The present invention relates to the field of communications technologies, and in particular, to a wireless backhaul method, a mobile terminal, and a system.

BACKGROUND

Backhaul refers to transmitting data from a base station to a core network device. Wireless backhaul can be construed as a process of transmitting data from a wireless access point to a base station or an evolved NodeB, and then transmitting, by the base station or the evolved NodeB, the data to a network device that is directly connected to the base station or the evolved NodeB.

A wireless mesh network needs to be constructed to implement wireless backhaul in the prior art, and a mesh network is a "multi-hop" network. A mesh network includes: a mesh wireless access point (MAP), a mesh portal point (MPP), and a mesh point (MP). The MPP and an access controller (AC) are connected in a wired manner, the MAP provides an access service to a client, and the MP is connected to the MPP and the MAP in a wireless manner. In an existing mesh network, to implement wireless backhaul, multiple MPs and MPPs need to be deployed in the network to construct the mesh network specifically for wireless backhaul.

SUMMARY

Embodiments of the present invention provide a mobile terminal, which can implement wireless backhaul to an access network device, without the need of specially setting an MP and an MPP to construct a special mesh network for wireless backhaul. The embodiments of the present invention further provide a corresponding wireless backhaul method and system.

A first aspect of the present invention provides a first mobile terminal, including:

a receiving unit, configured to receive wireless backhaul data that is sent by a wireless access point or a micro base station;

a determining unit, configured to determine, according to a wireless network connection relationship of the first mobile terminal, at least one wireless backhaul channel for transmitting the wireless backhaul data received by the receiving unit, where the wireless backhaul channel includes a first access network device connected to a core network device, or a first access network device connected to a core network device, and at least one of the following transit nodes: at least one second mobile terminal or at least one second access network device, where the wireless backhaul data is transmitted between the first mobile terminal and the first access network device by using a radio link, the wireless backhaul data is transmitted between the first mobile terminal and the second mobile terminal by using a radio link, the wireless backhaul data is transmitted between the second mobile terminals by using a radio link, the wireless backhaul data is transmitted between the second mobile terminal and the second access network device by using a radio link, and the wireless backhaul data is transmitted between the second access network devices by using a radio link; and a sending unit, configured to send the wireless backhaul data to the first access network device according to the wireless backhaul channel determined by the determining unit, where the first access network device is configured to send the wireless backhaul data to the core network device connected to the first access network device.

With reference to the first aspect, in a first possible implementation manner, the determining unit is configured to determine, according to the wireless network connection relationship of the first mobile terminal and according to load, at least one wireless backhaul channel, whose load satisfies a first preset condition, for transmitting the wireless backhaul data.

With reference to the first aspect, in a second possible implementation manner, the determining unit is configured to determine, according to the wireless network connection relationship of the mobile terminal and according to a priority, at least one wireless backhaul channel, whose priority satisfies a second preset condition, for transmitting the wireless backhaul data.

With reference to the first aspect, in a third possible implementation manner, the determining unit is configured to determine, according to the wireless network connection relationship of the mobile terminal and according to a QoS class identifier (QCI), at least one wireless backhaul channel, whose QCI satisfies a third preset condition, for transmitting the wireless backhaul data.

With reference to the first aspect, in a fourth possible implementation manner, the determining unit is configured to determine, according to the wireless network connection relationship of the mobile terminal and according to a preset identifier, at least one wireless backhaul channel, which is indicated by the preset identifier, for transmitting the wireless backhaul data.

With reference to any one of the first aspect, or the first to the fourth possible implementation manners of the first aspect, in a fifth possible implementation manner, when at least two said wireless backhaul channels are provided, the sending unit is configured to distribute the wireless backhaul data on the at least two wireless backhaul channels so that each wireless backhaul channel of the at least two wireless backhaul channels transmits a part of the wireless backhaul data.

A second aspect of the present invention provides a wireless backhaul method, including:

receiving, by a first mobile terminal, wireless backhaul data that is sent by a wireless access point or a micro base station;

determining, according to a wireless network connection relationship of the first mobile terminal, at least one wireless backhaul channel for transmitting the wireless backhaul data, where the wireless backhaul channel includes a first access network device connected to a core network device, or a first access network device connected to a core network device, and at least one of the following transit nodes: at least one second mobile terminal or at least one second access network device, where the wireless backhaul data is transmitted between the first mobile terminal and the first access network device by using a radio link, the wireless backhaul data is transmitted between the first mobile terminal and the second mobile terminal by using a radio link, the wireless backhaul data is transmitted between the second mobile terminals by using a radio link, the wireless backhaul data is transmitted between the second mobile terminal and the second access network device by using a radio link, and the wireless backhaul data is transmitted between the second access network devices by using a radio link; and sending the wireless backhaul data to the first access network device according to the wireless backhaul channel, where the first access network device is configured to send the wireless backhaul data to the core network device connected to the first access network device.

With reference to the second aspect, in a first possible implementation manner, the determining, according to a wireless network connection relationship of the first mobile terminal, at least one wireless backhaul channel for transmitting the wireless backhaul data includes:

determining, according to the wireless network connection relationship of the first mobile terminal and according to load, at least one wireless backhaul channel, whose load satisfies a first preset condition, for transmitting the wireless backhaul data.

With reference to the second aspect, in a second possible implementation manner, the determining, according to a wireless network connection relationship of the first mobile terminal, at least one wireless backhaul channel for transmitting the wireless backhaul data includes:

determining, according to the wireless network connection relationship of the mobile terminal and according to a priority, at least one wireless backhaul channel, whose priority satisfies a second preset condition, for transmitting the wireless backhaul data.

With reference to the second aspect, in a third possible implementation manner, the determining, according to a wireless network connection relationship of the first mobile terminal, at least one wireless backhaul channel for transmitting the wireless backhaul data includes:

determining, according to the wireless network connection relationship of the mobile terminal and according to a QCI, at least one wireless backhaul channel, whose QCI satisfies a third preset condition, for transmitting the wireless backhaul data.

With reference to the second aspect, in a fourth possible implementation manner, the determining, according to a wireless network connection relationship of the first mobile terminal, at least one wireless backhaul channel for transmitting the wireless backhaul data includes:

determining, according to the wireless network connection relationship of the mobile terminal and according to a preset identifier, at least one wireless backhaul channel, which is indicated by the preset identifier, for transmitting the wireless backhaul data.

With reference to any one of the second aspect or the first to the fourth possible implementation manners of the second aspect, in a fifth possible implementation manner, when at least two said wireless backhaul channels are provided, the sending the wireless backhaul data according to the wireless backhaul channel includes:

distributing the wireless backhaul data on the at least two wireless backhaul channels so that each wireless backhaul channel of the at least two wireless backhaul channels transmits a part of the wireless backhaul data.

A third aspect of the present invention provides a wireless backhaul system, including: a first mobile terminal, a first access network device, at least one second mobile terminal, and at least one second access network device, where the first mobile terminal receives wireless backhaul data that is sent by a wireless access point or a micro base station;

at least one wireless backhaul channel for transmitting the wireless backhaul data is determined according to a wireless network connection relationship of the first mobile terminal, where the wireless backhaul channel includes a first access network device connected to a core network device, or a first access network device connected to a core network device, and at least one of the following transit nodes: at least one second mobile terminal or at least one second access network device, where the wireless backhaul data is transmitted between the first mobile terminal and the first access network device by using a radio link, the wireless backhaul data is transmitted between the first mobile terminal and the second mobile terminal by using a radio link, the wireless backhaul data is transmitted between the second mobile terminals by using a radio link, the wireless backhaul data is transmitted between the second mobile terminal and the second access network device by using a radio link, and the wireless backhaul data is transmitted between the second access network devices by using a radio link; and the wireless backhaul data is sent to the first access network device according to the wireless backhaul channel, where the first access network device is configured to send the wireless backhaul data to the core network device connected to the first access network device.

The first mobile terminal provided in the embodiments of the present invention includes: a receiving unit, which receives wireless backhaul data that is sent by a wireless access point or a micro base station; a determining unit, which determines, according to a wireless network connection relationship of the first mobile terminal, at least one wireless backhaul channel for transmitting the wireless backhaul data received by the receiving unit, where the wireless backhaul channel includes a first access network device connected to a core network device, or a first access network device connected to a core network device, and at least one of the following transit nodes: at least one second mobile terminal or at least one second access network device; the wireless backhaul data is transmitted between the first mobile terminal and the first access network device by using a radio link, the wireless backhaul data is transmitted between the first mobile terminal and the second mobile terminal by using a radio link, the wireless backhaul data is transmitted between the second mobile terminals by using a radio link, the wireless backhaul data is transmitted between the second mobile terminal and the second access network device by using a radio link, and the wireless backhaul data is transmitted between the second access network devices by using a radio link; and a sending unit, which sends the wireless backhaul data to the first access network device according to the wireless backhaul channel determined by the determining unit, where the first access network device is configured to send the wireless backhaul data to the core network device connected to the first access network device. Compared with the prior art in which an MP and an MPP need to be set to construct a special mesh network to implement wireless backhaul, the mobile terminal provided in the embodiments of the present invention can implement wireless backhaul to an access network device without the need of specially setting an MP and an MPP to construct a special wireless backhaul network.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person skilled in the art may still derive other drawings from these accompanying drawings without creative efforts.

DETAILED DESCRIPTION

Embodiments of the present invention provide a mobile terminal, which can implement wireless backhaul to an access network device without the need of specially setting an MP and an MPP to construct a special mesh network for wireless backhaul. The embodiments of the present invention further provide a corresponding wireless backhaul method and system, which are separately described in detail below.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

In the embodiments of the present invention, a first access network device may be an evolved NodeB (eNB), a second access network may be a network node NodeB.

Figure 1:
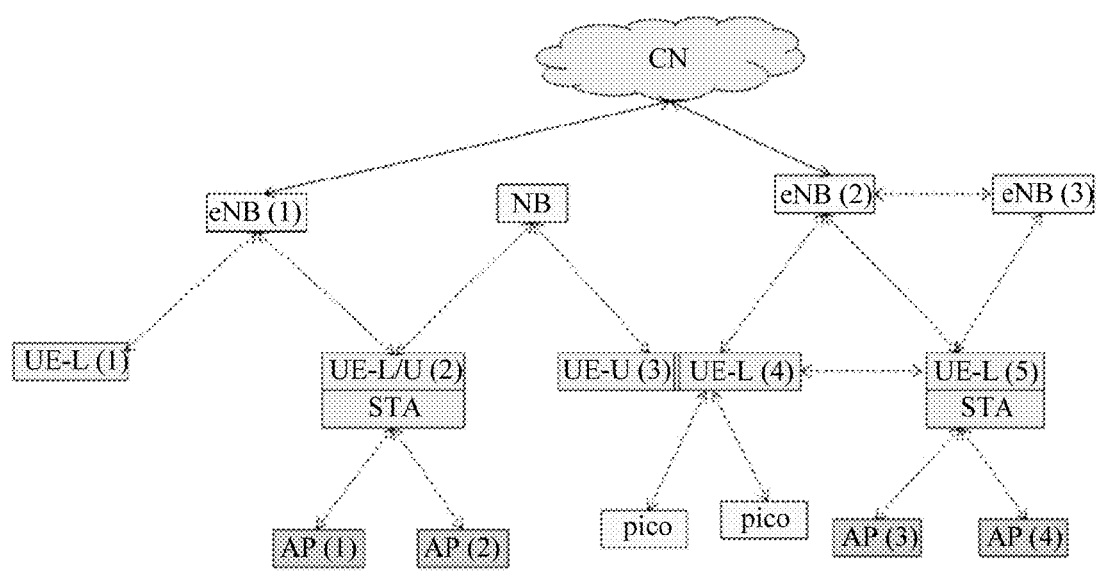
FIG. 1 is a schematic diagram of an embodiment of a wireless backhaul method according to the embodiments of the present invention.

Referring to FIG. 1, an embodiment of a wireless backhaul method provided by the embodiments of the present invention includes:

A heterogeneous network shown in FIG. 1 includes a universal mobile telecommunications system (UMTS), Long Term Evolution (LTE), wireless fidelity (WiFi), and the like.

In FIG. 1, an access point (AP) (1), an AP (2), an AP (3), and an AP (4) are all wireless local area network (WLAN) APs. User equipment (UE)-L (1) is a common LTE network terminal. UE-L/U (2) is a terminal supporting multiple access technologies, such as LTE, UMTS, and WLAN, and has a data forwarding function. UE-U (3) supports UMTS access and has a data forwarding function. UE-L (4) supports LTE access and has a data forwarding function. UE-L (5) supports access technologies such as LTE and WLAN, and has a data forwarding function.

The UE-L (1) is a common LTE network terminal and does not have a backhaul data forwarding function.

The UE-L (1), as a common terminal of an LTE network, can directly access the LTE network by using an eNB and accepts various services provided by the network. The UE-L (1) cannot receive wireless backhaul data sent by an AP or a small cell Pico. Therefore, the UE-L (1) cannot provide a wireless backhaul function.

The UE-L/U (2) has the following functions:

As regards the WLAN AP (1) and the WLAN AP (2), the UE-L/U (2) can transit, to an eNB (1), wireless backhaul data of a common wireless local area network station (WLAN STA) attached to the WLAN AP (1) and the WLAN AP (2), and then the eNB (1) transmits a control message or data to a core network device that is connected to the eNB (1) and that is at a core network side. Alternatively, the UE-L/U (2) may transit wireless backhaul data to an eNB (2) by using an NB, the UE-U (3), and the UE-L (4), and then the eNB (2) transmits the wireless backhaul data to a core network device that is connected to the eNB (2) and that is at a core network side. The wireless backhaul data is transmitted between the UE-L/U (2) and the eNB (1) by using a radio link; the wireless backhaul data is transmitted between the UE-L/U (2) and the NB by using a radio link; and the wireless backhaul data is transmitted between the NB and the UE-U (3), between the UE-U (3) and the UE-L (4), and between the UE-L (4) and the eNB (2) by using respective radio links. It may be understood that whether it is between terminals or between a terminal and a base station, the wireless backhaul data is transmitted by using a radio link. The wireless backhaul data may include a control message and service data. In addition, the NB, the UE-U (3), and the UE-L (4) that are between the UE-L/U (2) and the eNB (2) can all be construed as transit nodes.

A wireless backhaul channel in this embodiment of the present invention may also be construed as: a wireless backhaul channel from a mobile terminal that receives wireless backhaul data to a base station or an evolved NodeB that is connected to a core network device includes one radio link or includes multiple radio links connected in series.

For example, as shown in FIG. 1, the radio link between the UE-L/U (2) and the eNB (1) forms a first wireless backhaul channel over which the WLAN AP (1) and the WLAN AP (2) perform wireless backhaul communication with the core network device, and the radio link between the UE-L/U (2) and the NB, the radio link between the NB and the UE-U (3), the radio link between the UE-U (3) and the UE-L (4), and the radio link between UE-L (4) and the eNB (2) form a second wireless backhaul channel over which the WLAN AP (1) and the WLAN AP (2) perform wireless backhaul communication with the core network device. The radio link between the UE-L/U (2) and the NB, the radio link between the NB and the UE-U (3), the radio link between the UE-U (3) and the UE-L (4), a radio link between the UE-L (4) and the UE-L (5), and a radio link between the UE-L (5) and the eNB (2) form a third wireless backhaul channel over which the WLAN AP (1) and the WLAN AP (2) perform wireless backhaul communication with the core network device. The radio link between the UE-L/U (2) and the NB, the radio link between the NB and the UE-U (3), the radio link between the UE-U (3) and the UE-L (4), the radio link between the UE-L (4) and the UE-L (5), a radio link between the UE-L (5) and an eNB (3), and a radio link between the eNB (3) and the eNB (2) form a fourth wireless backhaul channel over which the WLAN AP (1) and the WLAN AP (2) perform wireless backhaul communication with the core network device.

A control message and subsequent service data of a common mobile terminal accessing the NB may pass through the UE-L/U (2) and the eNB (1) and then reach the core network device, or may pass through the UE-U (3), the UE-L (4), and the eNB (2) and then reach the core network device. In this case, a radio link between the NB and the UE-L/U (2) and the radio link between the UE-L/U (2) and the eNB (1) form a first wireless backhaul channel of the mobile terminal accessing the NB; the radio link between the NB and the UE-U (3), the radio link between the UE-U (3) and the UE-U (4), and the radio link between the UE-U (4) and the eNB (2) form a second wireless backhaul channel of the mobile terminal accessing the NB. The radio link between the NB and the UE-U (3), the radio link between the UE-U (3) and the UE-U (4), the radio link between the UE-L (4) and the UE-L (5), and a radio link between the UE-L (5) and the eNB (2) form a third wireless backhaul channel of the mobile terminal accessing the NB. The radio link between the NB and the UE-U (3), the radio link between the UE-U (3) and the UE-U (4), the radio link between the UE-L (4) and the UE-L (5), a radio link between the UE-L (5) and the eNB (3), and a radio link between the eNB (3) and the eNB (2) form a fourth wireless backhaul channel of the mobile terminal accessing the NB.

The UE-U (3) has the following functions:

transmitting data sent from the NB to the UE-L (4), therefore becoming a transit node in wireless backhaul; and transmitting data sent from the UE-L (4), therefore becoming a transit node in wireless backhaul.

The UE-L (4) has the following functions:

transmitting data sent from the UE-L (3), therefore becoming a transit node in wireless backhaul.

A control message and subsequent service data of a mobile terminal accessing a Pico may pass through the UE-L (4) and the eNB (2) to reach the core network device, or when service traffic is small, the control message and subsequent service data may pass through the UE-L (4), the UE-U (3), the NB, the UE-L/U (2), and the eNB (1) to reach the core network device; besides, the control message and subsequent service data may also pass through the UE-L (4), the UE-L (5), and the eNB (2) to reach the core network device.

In this way, the radio link between the UE-L (4) and the eNB (2) forms a first wireless backhaul channel over which the Pico performs wireless backhaul communication with the core network device; the radio link between the UE-L (4) and the UE-L (5) and the radio link between the UE-L (5) and the eNB (2) form a second wireless backhaul channel over which the Pico performs wireless backhaul communication with a core network side device; a radio link between the UE-L (4) and the UE-U (3), a radio link between the UE-U (3) and the NB, the radio link between the NB and the UE-L/U (2), and the radio link between the UE-L/U (2) and the eNB (1) form a third wireless backhaul channel over which the Pico performs wireless backhaul communication with the core network side device. The radio link between the UE-L (4) and the UE-L (5), the radio link between the UE-L (5) and the eNB (3), and the radio link between the eNB (3) and the eNB (2) form a fourth wireless backhaul channel over which the Pico performs wireless backhaul communication with the core network side device.

The UE-L (5) has the following functions:

transmitting a WLAN STA control message and subsequent service data from the AP (3) and the AP (4) to the eNB (2) and then to a core network; or first to the eNB (3), then to the eNB (2), and finally to the core network; or to the UE-L (4), then to a subsequent node, and to the core network; and transmitting data sent from the UE-L (4).

In this way, a radio link between the UE-L (5) and the eNB (2) forms a first wireless backhaul channel over which the WLAN AP (3) and the WLAN AP (4) perform wireless backhaul communication with the core network side device. A radio link between the UE-L (5) and the eNB (3) and the radio link between the eNB (3) and the eNB (2) form a second wireless backhaul channel over which the WLAN AP (3) and the WLAN AP (4) perform wireless backhaul communication with the core network side device. A radio link between the UE-L (5) and the UE-L (4) and the radio link between the UE-L (4) and the eNB (2) form a third wireless backhaul channel over which the WLAN AP (3) and the WLAN AP (4) perform wireless backhaul communication with the core network side device. The radio link between the UE-L (5) and the UE-L (4), a radio link between the UE-L (4) and the UE-U (3), a radio link between the UE-U (3) and the NB, a link between the NB and the UE-L (1), and a radio link between the UE-L (1) and the eNB (1) form a fourth wireless backhaul channel over which the WLAN AP (3) and the WLAN AP (4) perform wireless backhaul communication with the core network side device.

After the UE-L/U (2) receives wireless backhaul data, a wireless backhaul channel whose load satisfies a first preset condition is first determined among the four wireless backhaul channels over which the WLAN AP (1) and the WLAN AP (2) perform wireless backhaul communication with the core network device, and then at least one wireless backhaul channel whose load satisfies the first preset condition is selected to transmit the wireless backhaul data. For example, when load of the wireless backhaul channel between the UE-L/U (2) and the eNB (1) satisfies the first preset condition, the wireless backhaul data is sent to the eNB (1) by using the UE-L/U (2).

In this embodiment of the present invention, that load satisfies the first preset condition may be: the load is lower than a first preset threshold or the load is within a value range of a preset value, and the wireless backhaul channel satisfying the first preset condition may also be a preset quantity of wireless backhaul channels with minimum load. For example, the wireless backhaul channel may be two wireless backhaul channels with minimum load.

The UE-L/U (2) may also determine a wireless backhaul channel whose priority satisfies a second preset condition among the four wireless backhaul channels over which the WLAN AP (1) and the WLAN AP (2) perform wireless backhaul communication with the core network device, and then select at least one wireless backhaul channel whose priority satisfies the second preset condition to transmit the wireless backhaul data.

That a priority satisfies the second preset condition may be: the priority is higher than a second preset threshold or the priority is within a value range of a preset value, and the wireless backhaul channel satisfying the second preset condition may also be a preset quantity of wireless backhaul channels with highest priorities. For example, the wireless backhaul channel may be two wireless backhaul channels with highest priorities.

The UE-L/U (2) may also determine a wireless backhaul channel whose QCI satisfies a third preset condition among the four wireless backhaul channels over which the WLAN AP (1) and the WLAN AP (2) perform wireless backhaul communication with the core network device, and then select at least one wireless backhaul channel whose QCI satisfies the third preset condition to transmit the wireless backhaul data.

That a QCI satisfies the third preset condition may be: the QCI is higher than a third preset threshold or the QCI is within a value range of a preset value, and the wireless backhaul channel satisfying the third preset condition may also be a preset quantity of wireless backhaul channels with the highest QCIs. For example, the wireless backhaul channel may be two wireless backhaul channels with highest QCIs.

The first preset threshold, the second preset threshold, and the third preset threshold are all preset values and may be preset by an engineer according to requirements. Specific values are not limited; value ranges of the preset values and preset quantities can all be set in advance, and specific values thereof are not limited.

The UE-L/U (2) may also determine, among the four wireless backhaul channels over which the WLAN AP (1) and the WLAN AP (2) perform wireless backhaul communication with the core network device, at least one wireless backhaul channel indicated by a preset identifier to transmit the wireless backhaul data. For example, when the preset identifier indicates to select the wireless backhaul channel between the UE-L/U (2) and the eNB (1), the wireless backhaul channel between the UE-L/U (2) and the eNB (1) is selected to transmit the wireless backhaul data.

When the wireless data is transmitted by using a wireless backhaul channel, if only one wireless backhaul channel is selected, the wireless backhaul data is sent on the wireless backhaul channel; if at least two wireless backhaul channels are selected to transmit the wireless backhaul data, a part of the wireless backhaul data is transmitted on each wireless backhaul channel, and a total amount of the wireless backhaul data transmitted on the at least two wireless backhaul channels remains unchanged.

Wireless backhaul communication between the Pico and the core network side device and wireless backhaul communication between the WLAN AP (3) as well as the WLAN AP (4) and the core network side device may be understood with reference to the foregoing wireless backhaul communication between the WLAN AP (1) as well as the WLAN AP (2) and the core network side device; details are not described herein again.

Figure 2:
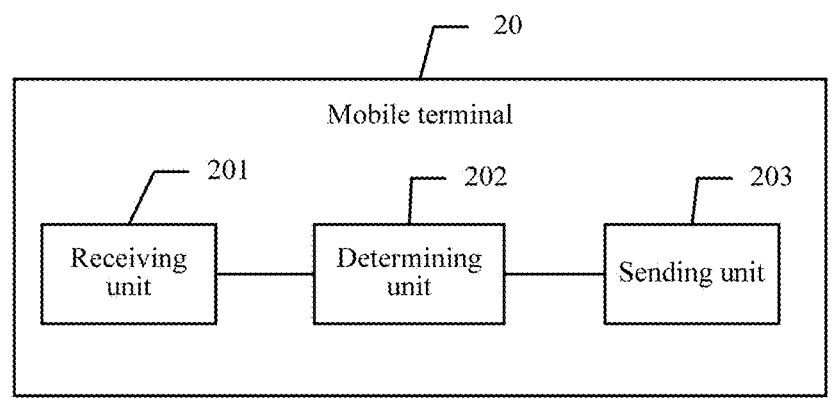
FIG. 2 is a schematic diagram of an embodiment of a mobile terminal according to the embodiments of the present invention.

Referring to FIG. 2, an embodiment of a mobile terminal 20 provided by the embodiments of the present invention includes:

a receiving unit 201, configured to receive wireless backhaul data that is sent by a wireless access point or a micro base station;

a determining unit 202, configured to determine, according to a wireless network connection relationship of the first mobile terminal, at least one wireless backhaul channel for transmitting the wireless backhaul data received by the receiving unit 201, where the wireless backhaul channel includes a first access network device connected to a core network device, or a first access network device connected to a core network device, and at least one of the following transit nodes: at least one second mobile terminal or at least one second access network device, where the wireless backhaul data is transmitted between the first mobile terminal and the first access network device by using a radio link, the wireless backhaul data is transmitted between the first mobile terminal and the second mobile terminal by using a radio link, the wireless backhaul data is transmitted between the second mobile terminals by using a radio link, the wireless backhaul data is transmitted between the second mobile terminal and the second access network device by using a radio link, and the wireless backhaul data is transmitted between the second access network devices by using a radio link; and a sending unit 203, configured to send the wireless backhaul data to the first access network device according to the wireless backhaul channel determined by the determining unit 202, where the first access network device is configured to send the wireless backhaul data to the core network device connected to the first access network device.

In this embodiment of the present invention, the receiving unit 201 receives wireless backhaul data that is sent by a wireless access point or a micro base station; the determining unit 202 determines, according to a wireless network connection relationship of the first mobile terminal, at least one wireless backhaul channel for transmitting the wireless backhaul data received by the receiving unit 201, where the wireless backhaul channel includes a first access network device connected to a core network device, or a first access network device connected to a core network device, and at least one of the following transit nodes: at least one second mobile terminal or at least one second access network device; the wireless backhaul data is transmitted between the first mobile terminal and the first access network device by using a radio link, the wireless backhaul data is transmitted between the first mobile terminal and the second mobile terminal by using a radio link, the wireless backhaul data is transmitted between the second mobile terminals by using a radio link, the wireless backhaul data is transmitted between the second mobile terminal and the second access network device by using a radio link, and the wireless backhaul data is transmitted between the second access network devices by using a radio link; and the sending unit 203 sends the wireless backhaul data to the first access network device according to the wireless backhaul channel determined by the determining unit 202, where the first access network device is configured to send the wireless backhaul data to the core network device connected to the first access network device. Compared with the prior art in which an MP and an MPP need to be set to construct a special mesh network to implement wireless backhaul, the mobile terminal provided in this embodiment of the present invention can implement wireless backhaul to an access network device without the need of specially setting an MP and an MPP to construct a special wireless backhaul network.

Optionally, based on the foregoing embodiment corresponding to FIG. 2, in another embodiment of the mobile terminal provided in the embodiments of the present invention, the determining unit 202 is configured to determine, according to the wireless network connection relationship of the first mobile terminal and according to load, at least one wireless backhaul channel, whose load satisfies a first preset condition, for transmitting the wireless backhaul data.

Optionally, based on the foregoing embodiment corresponding to FIG. 2, in another embodiment of the mobile terminal provided in the embodiments of the present invention, the determining unit 202 is configured to determine, according to the wireless network connection relationship of the mobile terminal and according to a priority, at least one wireless backhaul channel, whose priority satisfies a second preset condition, for transmitting the wireless backhaul data.

Optionally, based on the foregoing embodiment corresponding to FIG. 2, in another embodiment of the mobile terminal provided in the embodiments of the present invention, the determining unit 202 is configured to determine, according to the wireless network connection relationship of the mobile terminal and according to a QCI, at least one wireless backhaul channel, whose QCI satisfies a third preset condition, for transmitting the wireless backhaul data.

Optionally, based on the foregoing embodiment corresponding to FIG. 2, in another embodiment of the mobile terminal provided in the embodiments of the present invention, the determining unit 202 is configured to determine, according to the wireless network connection relationship of the mobile terminal according to a preset identifier, at least one wireless backhaul channel, which is indicated by the preset identifier, for transmitting the wireless backhaul data.

Optionally, based on the foregoing embodiment corresponding to FIG. 2, in another embodiment of the mobile terminal provided in the embodiments of the present invention, when at least two said wireless backhaul channels are provided, the sending unit 203 is configured to distribute the wireless backhaul data on the at least two wireless backhaul channels so that each wireless backhaul channel of the at least two wireless backhaul channels transmits a part of the wireless backhaul data.

Functions of the mobile terminal provided in this embodiment of the present invention may be understood with reference to the description related to FIG. 1 and are not described in further detail herein.

Figure 3:
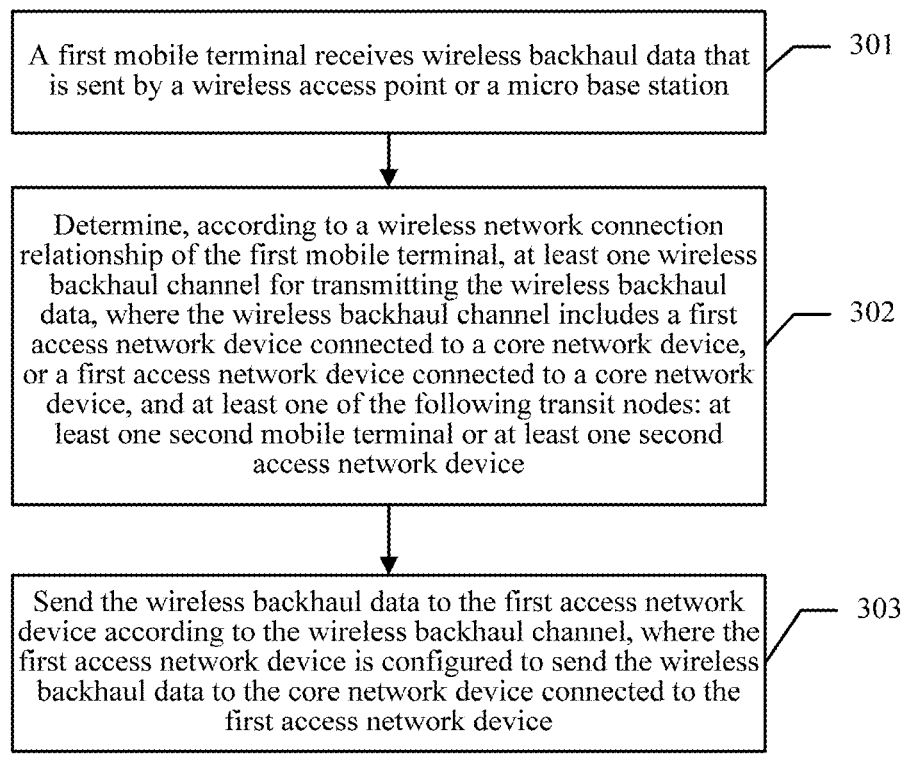
FIG. 3 is a schematic diagram of another embodiment of a wireless backhaul method according to the embodiments of the present invention.

Referring to FIG. 3, an embodiment of a wireless backhaul method provided by the embodiments of the present invention includes:

301: A first mobile terminal receives wireless backhaul data that is sent by a wireless access point or a micro base station.

302: Determine, according to a wireless network connection relationship of the first mobile terminal, at least one wireless backhaul channel for transmitting the wireless backhaul data, where the wireless backhaul channel includes a first access network device connected to a core network device, or a first access network device connected to a core network device, and at least one of the following transit nodes: at least one second mobile terminal or at least one second access network device.

The wireless backhaul data is transmitted between the first mobile terminal and the first access network device by using a radio link, the wireless backhaul data is transmitted between the first mobile terminal and the second mobile terminal by using a radio link, the wireless backhaul data is transmitted between the second mobile terminals by using a radio link, the wireless backhaul data is transmitted between the second mobile terminal and the second access network device by using a radio link, and the wireless backhaul data is transmitted between the second access network devices by using a radio link.

In this embodiment of the present invention, between mobile terminals, between a mobile terminal and an access network device, and between access network devices, the wireless backhaul data is transmitted by using respective radio links.

303: Send the wireless backhaul data to the first access network device according to the wireless backhaul channel, where the first access network device is configured to send the wireless backhaul data to the core network device connected to the first access network device.

In this embodiment of the present invention, the first mobile terminal receives wireless backhaul data that is sent by a wireless access point or a micro base station; determines, according to a wireless network connection relationship of the first mobile terminal, at least one wireless backhaul channel for transmitting the wireless backhaul data, where the wireless backhaul channel includes a first access network device connected to a core network device, or a first access network device connected to a core network device, and at least one of the following transit nodes: at least one second mobile terminal or at least one second access network device, where the wireless backhaul data is transmitted between the first mobile terminal and the first access network device by using a radio link, the wireless backhaul data is transmitted between the first mobile terminal and the second mobile terminal by using a radio link, the wireless backhaul data is transmitted between the second mobile terminals by using a radio link, the wireless backhaul data is transmitted between the second mobile terminal and the second access network device by using a radio link, and the wireless backhaul data is transmitted between the second access network devices by using a radio link; and the first mobile terminal sends the wireless backhaul data to the first access network device according to the wireless backhaul channel, where the first access network device is configured to send the wireless backhaul data to the core network device connected to the first access network device. Compared with the prior art in which an MP and an MPP need to be set to construct a special mesh network to implement wireless backhaul, the wireless backhaul method, the mobile terminal, and some transit nodes that are provided in this embodiment of the present invention can implement wireless backhaul to an access network device, without the need of specially setting an MP and an MPP construct a special wireless backhaul network.

Optionally, based on the embodiment corresponding to FIG. 3, in another embodiment of the wireless backhaul method provided in the embodiments of the present invention, the determining, according to a wireless network connection relationship of the first mobile terminal, at least one wireless backhaul channel for transmitting the wireless backhaul data may include:

determining, according to the wireless network connection relationship of the first mobile terminal and according to load, at least one wireless backhaul channel, whose load satisfies a first preset condition, for transmitting the wireless backhaul data.

Optionally, based on the embodiment corresponding to FIG. 3, in another embodiment of the wireless backhaul method provided in the embodiments of the present invention, the determining, according to a wireless network connection relationship of the first mobile terminal, at least one wireless backhaul channel for transmitting the wireless backhaul data may include:

determining, according to the wireless network connection relationship of the mobile terminal and according to a priority, at least one wireless backhaul channel, whose priority satisfies a second preset condition, for transmitting the wireless backhaul data.

Optionally, based on the embodiment corresponding to FIG. 3, in another embodiment of the wireless backhaul method provided in the embodiments of the present invention, the determining, according to a wireless network connection relationship of the first mobile terminal, at least one wireless backhaul channel for transmitting the wireless backhaul data may include:

determining, according to the wireless network connection relationship of the mobile terminal and according to a QCI, at least one wireless backhaul channel, whose QCI satisfies a third preset condition, for transmitting the wireless backhaul data.

Optionally, based on the embodiment corresponding to FIG. 3, in another embodiment of the wireless backhaul method provided in the embodiments of the present invention, the determining, according to a wireless network connection relationship of the first mobile terminal, at least one wireless backhaul channel for transmitting the wireless backhaul data may include:

determining, according to the wireless network connection relationship of the mobile terminal and according to a preset identifier, at least one wireless backhaul channel, which is indicated by the preset identifier, for transmitting the wireless backhaul data.

Optionally, based on the embodiment corresponding to FIG. 3 or any optional embodiment, in another embodiment of the wireless backhaul method provided in the embodiments of the present invention, when at least two said wireless backhaul channels are provided, the sending the wireless backhaul data according to the wireless backhaul channel may include:

distributing the wireless backhaul data on the at least two wireless backhaul channels so that each wireless backhaul channel of the at least two wireless backhaul channels transmits a part of the wireless backhaul data.

The wireless backhaul method provided in this embodiment of the present invention may be understood with reference to the description related to FIG. 1 and is not described in further detail herein.

Figure 4:
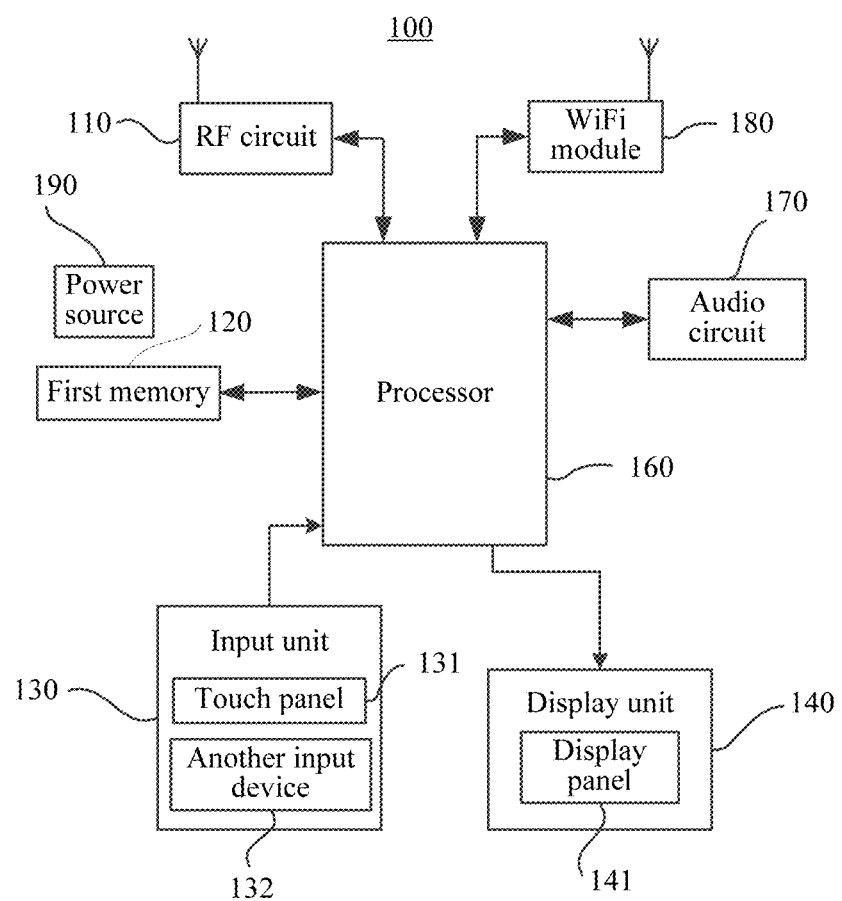
FIG. 4 is a schematic diagram of another embodiment of a mobile terminal according to the embodiments of the present invention.

FIG. 4 shows a schematic structural diagram of a terminal device 100 according to an embodiment of the present invention.

Referring to FIG. 4, the terminal device 100 of this embodiment of the present invention includes a first memory 120, a processor 160, an input unit 130, and a radio frequency RF circuit 110, where the first memory 120 stores a wireless network connection relationship between a terminal and other devices in a wireless network.

The input unit 130 is configured to receive wireless backhaul data that is sent by a wireless access point or a micro base station.

It may be understood that the first memory 120 may be an external storage or an internal storage of the terminal device 100. The first memory 120 may be one of a non-volatile memory (NVRAM), a dynamic random access memory (DRAM), a static random access memory (SRAM), a flash memory, and the like, or may be a hard disk, an optical disc, a USB disk, a floppy disk, or a tape drive.

The processor 160 is configured to determine, according to the wireless network connection relationship of the first mobile terminal stored in the first memory 120, at least one wireless backhaul channel for transmitting the wireless backhaul data, where the wireless backhaul channel includes a first access network device connected to a core network device, or a first access network device connected to a core network device, and at least one of the following transit nodes: at least one second mobile terminal or at least one second access network device.

The wireless backhaul data is transmitted between the first mobile terminal and the first access network device by using a radio link, the wireless backhaul data is transmitted between the first mobile terminal and the second mobile terminal by using a radio link, the wireless backhaul data is transmitted between the second mobile terminals by using a radio link, the wireless backhaul data is transmitted between the second mobile terminal and the second access network device by using a radio link, and the wireless backhaul data is transmitted between the second access network devices by using a radio link.

The processor 160 is specifically configured to determine, according to the wireless network connection relationship of the first mobile terminal and according to load, at least one wireless backhaul channel, whose load satisfies a first preset condition, for transmitting the wireless backhaul data.

The processor 160 is specifically configured to determine, according to the wireless network connection relationship of the mobile terminal and according to priority, at least one wireless backhaul channel, whose priority satisfies a second preset condition, for transmitting the wireless backhaul data.

The processor 160 is specifically configured to determine, according to the wireless network connection relationship of the mobile terminal and according to a QCI, at least one wireless backhaul channel, whose QCI satisfies a third preset condition, for transmitting the wireless backhaul data.

The processor 160 is specifically configured to determine, according to the wireless network connection relationship of the mobile terminal and according to a preset identifier, at least one wireless backhaul channel, which is indicated by the preset identifier, for transmitting the wireless backhaul data.

The RF circuit 110 is configured to send the wireless backhaul data to the first access network device, where the first access network device is configured to send the wireless backhaul data to the core network device connected to the first access network device.

Specifically, in this embodiment of the present invention, the input unit 130 may include a touch panel 131. The touch panel 131, also referred to as a touchscreen, may collect a touch operation performed by a user on or near the touch panel 131 (such as an operation of a user on or near the touch panel 131 by using any suitable object or accessory, such as a finger or stylus), and drive a corresponding connected apparatus according to a preset program. Optionally, the touch panel 131 may include two parts: a touch detection apparatus and a touch controller. The touch detection apparatus detects a touch orientation of the user, detects a signal caused by the touch operation, and transmits the signal to the touch controller. The touch controller receives touch information from the touch detection apparatus, converts the touch information into touch point coordinates, and then sends the touch point coordinates to the processor 160; and moreover, the touch controller can receive and execute a command sent from the processor 160. In addition, the touch panel 131 may be implemented by using multiple types, such as a resistive type, a capacitive type, an infrared ray type, and a surface acoustic wave type. In addition to the touch panel 131, the input unit 130 may further include another input device 132, and the another input device 132 may include, but not limited to, one or more of a physical keyword, a functional key (such as a volume control key and a switch key), a trackball, a mouse, or a joystick.

The terminal device 100 may further include a display unit 140, and the display unit 140 may be configured to display information entered by the user or information provided to the user, and various menu interfaces of the terminal device 100. The display unit 140 may include a display panel 141. Optionally, the display panel 141 may be configured in a form such as a liquid crystal display (LCD) and an organic light-emitting diode (OLED).

In this embodiment of the present invention, the touch panel 131 covers the display panel 141, forming a touch display screen 142. After detecting a touch operation performed on or near the touch display screen 142, the touch display screen 142 transmits the touch operation to the processor 160 to determine a type of a touch event; then the processor 160 provides corresponding visual output on the touch display screen 142 according to the type of the touch event.

In this embodiment of the present invention, the touch display screen 142 includes an application program interface display area 143 and a common control display area 144. An arrangement manner of the application program interface display area 143 and the common control display area 144 is not limited and may be an arrangement manner in which the two display areas can be differentiated, for example, the two display areas are vertically arranged or arranged side by side. The application program interface display area 143 may be configured to display an interface of an application program. Each interface may include interface elements such as an icon and/or a widget desktop control of at least one application program. The application program interface display area 143 may also be a blank interface without any content. The common control display area 144 is configured to display controls used at relatively high frequency, for example, a set button, an interface serial number, a scroll bar, and an application program icon such as a phone book icon.

The processor 160 is a control center of the mobile terminal 100, and connects to various parts of a whole mobile phone by using various interfaces and lines, By running or executing software programs and/or modules stored in the first memory 120 and calling data stored in the first memory 120, the processor 160 executes various functions of the terminal device 100 and processes data, thereby performing overall monitoring on the terminal device 100. Optionally, the processor 160 may include one or more processing units.

The RF circuit 110 is specifically configured to distribute the wireless backhaul data on the at least two wireless backhaul channels so that each wireless backhaul channel of the at least two wireless backhaul channels transmits a part of the wireless backhaul data.

It can be seen that the terminal device of this embodiment of the present invention can implement wireless backhaul to an access network device without the need of specially setting an MP and an MPP to construct a special wireless backhaul network.

Figure 5:
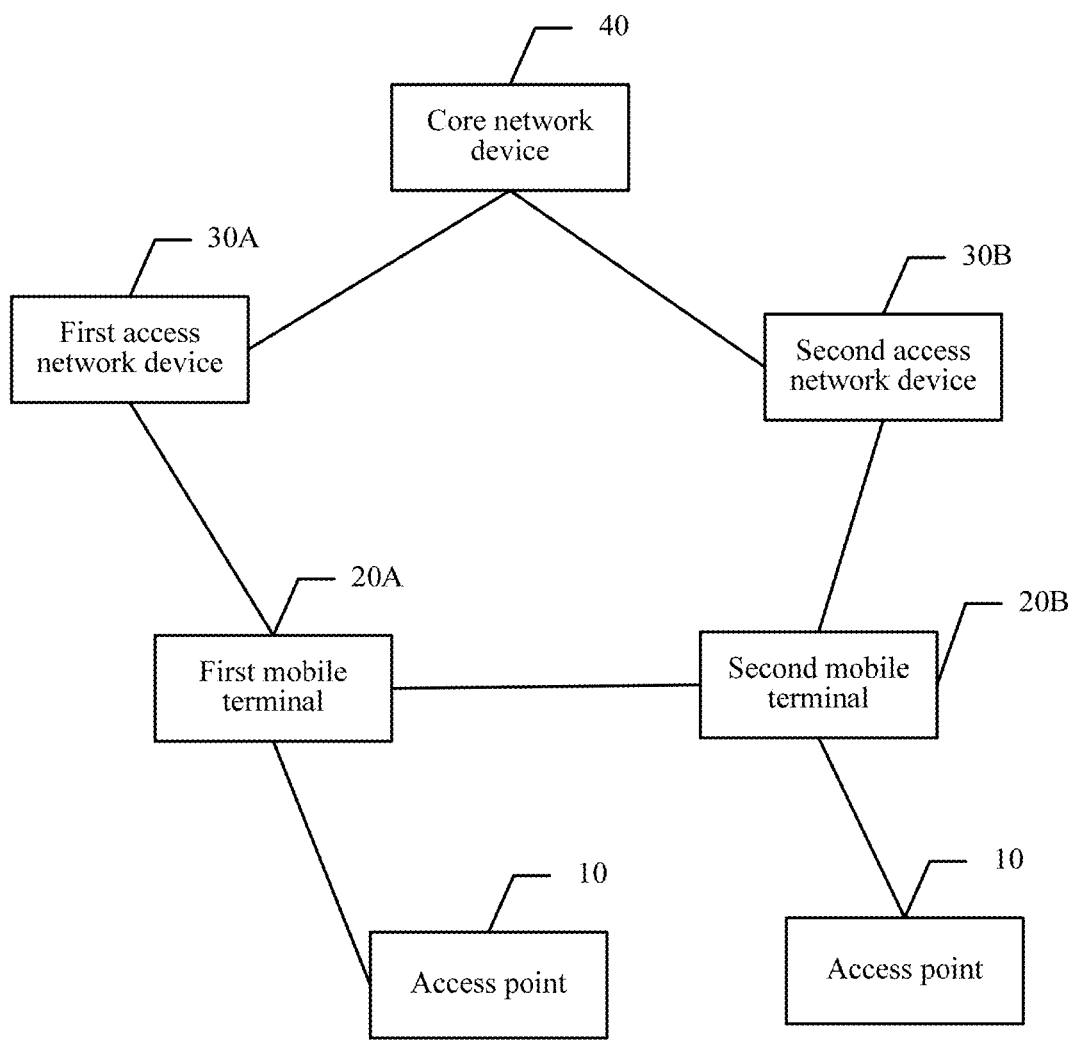
FIG. 5 is a schematic diagram of an embodiment of a wireless backhaul system according to the embodiments of the present invention.

Referring to FIG. 5, one embodiment of a wireless backhaul system provided according to the embodiments of the present invention includes: a first mobile terminal 20A, a first access network device 30A, at least one second mobile terminal 20B (only one second mobile terminal 20B is shown in FIG. 5, but a quantity of the second mobile terminals 20B is not limited), and at least one second access network device 30B (only one second access network device 30B is shown in FIG. 5, but a quantity of the second access network devices 30B is not limited).

The first mobile terminal 20A receives wireless backhaul data that is sent by a wireless access point 10 or a micro base station;

determines, according to a wireless network connection relationship of the first mobile terminal 20A, at least one wireless backhaul channel for transmitting the wireless backhaul data, where the wireless backhaul channel includes a first access network device 30A connected to a core network device, or a first access network device 30A connected to a core network device 40, and at least one of the following transit nodes: at least one second mobile terminal 20B and at least one second access network device 30B, where the wireless backhaul data is transmitted between the first mobile terminal 20A and the first access network device 30A by using a radio link, the wireless backhaul data is transmitted between the first mobile terminal 20A and the second mobile terminal 20B by using a radio link, the wireless backhaul data is transmitted between the second mobile terminals 20B by using a radio link, the wireless backhaul data is transmitted between the second mobile terminal 20B and the second access network device 30B by using a radio link, and the wireless backhaul data is transmitted between the second access network devices 30B by using a radio link; and sends the wireless backhaul data to the first access network device according to the wireless backhaul channel, where the first access network device is configured to send the wireless backhaul data to the core network device connected to the first access network device.

It can be seen that in the wireless backhaul system in this embodiment of the present invention, it is unnecessary to specially set an MP and an MPP to construct a special wireless backhaul network.

A person of ordinary skill in the art may understand that all or a part of the steps of the methods in the embodiments may be implemented by a program instructing relevant hardware. The program may be stored in a computer readable storage medium. The storage medium may include: a ROM, a RAM, a magnetic disk, or an optical disc.

The mobile terminal and the wireless backhaul method and system that are provided in the embodiments of the present invention are described in detail above. The principle and implementation manners of the present invention are described herein through specific examples. The description about the embodiments is merely provided to help understand the method and core ideas of the present invention. In addition, persons of ordinary skill in the art can make variations to the present invention in terms of the specific implementation manners and application scopes according to the ideas of the present invention. In conclusion, the content of specification shall not be construed as a limit to the present invention.

What is claimed is:

1. A first mobile terminal, comprising:
a receiver, configured to receive wireless backhaul data sent by a wireless access point or a micro base station;
a processor, configured to determine, according to a wireless network connection relationship of the first mobile terminal, a wireless backhaul channel among multiple possible wireless backhaul channels for transmitting the wireless backhaul data received by the receiver, wherein a first of the possible wireless backhaul channels comprises a first access network device connected to a core network device, and a second of the possible wireless backhaul channels comprises the first access network device connected to the core network device and at least one of the following transit nodes: at least one second mobile terminal or at least one second access network device, and wherein the wireless backhaul data is transmitted between the first mobile terminal and the first access network device by using a radio link, the wireless backhaul data is transmitted between the first mobile terminal and the second mobile terminal by using a radio link, and the wireless backhaul data is transmitted between the second mobile terminal and the second access network device by using a radio link; and
a sender, configured to send the wireless backhaul data to the first access network device according to the wireless backhaul channel determined by the processor, wherein the wireless backhaul data is configured to be sent by the first access network device to the core network device.

2. The first mobile terminal according to claim 1, wherein the processor is further configured to determine the wireless backhaul channel according to load, wherein a load of the wireless backhaul channel satisfies a first preset condition.

3. The first mobile terminal according to claim 1, wherein the processor is further configured to determine the wireless backhaul channel according to a priority, wherein a priority of the wireless backhaul channel satisfies a second preset condition.

4. The first mobile terminal according to claim 1, wherein the processor is further configured to determine the wireless backhaul channel according to a QoS class identifier (QCI), wherein a QCI of the wireless backhaul channel satisfies a third preset condition.

5. The first mobile terminal according to claim 1, wherein the processor is further configured to determine the wireless backhaul channel according to a preset identifier that indicates the wireless backhaul channel.

6. The first mobile terminal according to claim 1, wherein:
the wireless backhaul channel is a first wireless backhaul channel;
the processor is configured to determine, according to the wireless network connection relationship of the first mobile terminal, at least one second wireless backhaul channel among the multiple possible wireless backhaul channels for transmitting the wireless backhaul data; and
the sender is configured to distribute the wireless backhaul data on the first wireless backhaul channel and the at least one second wireless backhaul channel so that each wireless backhaul channel transmits a part of the wireless backhaul data.

7. A wireless backhaul method, comprising:
receiving, by a first mobile terminal, wireless backhaul data sent by a wireless access point or a micro base station;
determining, according to a wireless network connection relationship of the first mobile terminal, a wireless backhaul channel among multiple possible wireless backhaul channels for transmitting the wireless backhaul data, wherein a first of the possible wireless backhaul channels comprises a first access network device connected to a core network device, and a second of the possible wireless backhaul channels comprises the first access network device connected to the core network device and at least one of the following transit nodes: at least one second mobile terminal or at least one second access network device, and wherein the wireless backhaul data is transmitted between the first mobile terminal and the first access network device by using a radio link, the wireless backhaul data is transmitted between the first mobile terminal and the second mobile terminal by using a radio link, and the wireless backhaul data is transmitted between the second mobile terminal and the second access network device by using a radio link; and
sending the wireless backhaul data to the first access network device according to the wireless backhaul channel, wherein the wireless backhaul data is configured to be sent by the first access network device to the core network device.

8. The method according to claim 7, wherein determining, according to a wireless network connection relationship of the first mobile terminal, a wireless backhaul channel for transmitting the wireless backhaul data comprises:
determining, according to the wireless network connection relationship of the first mobile terminal and according to load, the wireless backhaul channel, wherein a load of the wireless backhaul channel satisfies a first preset condition.

9. The method according to claim 7, wherein determining, according to a wireless network connection relationship of the first mobile terminal, a wireless backhaul channel for transmitting the wireless backhaul data comprises:
determining, according to the wireless network connection relationship of the first mobile terminal and according to a priority, the wireless backhaul channel, wherein a priority of the wireless backhaul channel satisfies a second preset condition.

10. The method according to claim 7, wherein determining, according to a wireless network connection relationship of the first mobile terminal, a wireless backhaul channel for transmitting the wireless backhaul data comprises:
determining, according to a QoS class identifier (QCI), according to the wireless network connection relationship of the first mobile terminal, the wireless backhaul channel, wherein a QCI of the wireless backhaul channel satisfies a third preset condition.

11. The method according to claim 7, wherein determining, according to a wireless network connection relationship of the first mobile terminal, a wireless backhaul channel for transmitting the wireless backhaul data comprises:
determining the wireless backhaul channel, according to the wireless network connection relationship of the first mobile terminal and according to a preset identifier that identifies the wireless backhaul channel.

12. The method according to claim 7, wherein:
the wireless backhaul channel is a first wireless backhaul channel;
the method further comprises:
determining, according to the wireless network connection relationship of the first mobile terminal, at least one second wireless backhaul channel among the multiple possible wireless backhaul channels for transmitting the wireless backhaul data; and
distributing the wireless backhaul data on the first wireless backhaul channel and the at least one second wireless backhaul channel so that each wireless backhaul channel transmits a part of the wireless backhaul data.

13. A wireless backhaul system, comprising:
a first mobile terminal configured to receive wireless backhaul data sent by a wireless access point or a micro base station;
at least one wireless backhaul channel for transmitting the wireless backhaul data that is determined among multiple possible wireless backhaul channels according to a wireless network connection relationship of the first mobile terminal, wherein a first of the possible wireless backhaul channels comprises a first access network device connected to a core network device, and a second of the possible wireless backhaul channels comprises the first access network device connected to the core network device and at least one of the following transit nodes: at least one second mobile terminal or at least one second access network device, and wherein the wireless backhaul data is transmitted between the first mobile terminal and the first access network device by using a radio link, the wireless backhaul data is transmitted between the first mobile terminal and the second mobile terminal by using a radio link, and the wireless backhaul data is transmitted between the second mobile terminal and the second access network device by using a radio link; and wherein the wireless backhaul data is sent to the first access network device according to the at least one wireless backhaul channel, wherein the wireless backhaul data is configured to be sent by the first access network device is to the core network device.

\* \* \* \* \*